(12) United States Patent
Speck et al.

(10) Patent No.: US 12,273,368 B1
(45) Date of Patent: *Apr. 8, 2025

(54) CYBER VULNERABILITY ASSESSMENT TOOL THREAT ASSESSMENT HEURISTIC

(71) Applicant: The United States of America, as represented by the Secretary of the Navy, Arlington, VA (US)

(72) Inventors: Jacquelin A. Speck, Philadelphia, PA (US); Thomas Heverin, Philadelphia, PA (US); Mark Roman, Aston, PA (US); Marcello Balduccini, Wynnewood, PA (US); Matthew Bosack, Philadelphia, PA (US)

(73) Assignee: The United States of America, as represented by the Secretary of the Navy, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/510,913

(22) Filed: Nov. 16, 2023

Related U.S. Application Data

(63) Continuation of application No. 16/949,154, filed on Oct. 15, 2020, now Pat. No. 11,863,578.

(60) Provisional application No. 62/915,085, filed on Oct. 15, 2019.

(51) Int. Cl.
*H04L 9/40* (2022.01)
*G06N 5/01* (2023.01)
*H04L 12/40* (2006.01)

(52) U.S. Cl.
CPC ........... *H04L 63/1433* (2013.01); *G06N 5/01* (2023.01); *H04L 2012/40286* (2013.01)

(58) Field of Classification Search
CPC ...... H04L 63/1433; H04L 2012/40286; G06N 5/01

See application file for complete search history.

(56) References Cited

U.S. PATENT DOCUMENTS

| | | | |
|---|---|---|---|
| 8,272,061 B1 | 9/2012 | Lotem et al. | |
| 11,444,974 B1 * | 9/2022 | Shakhzadyan | H04L 63/1466 |
| 11,863,578 B1 * | 1/2024 | Speck | G06N 5/01 |
| 2018/0288085 A1 * | 10/2018 | Hailpern | G06F 11/3006 |
| 2018/0337939 A1 * | 11/2018 | Agarwal | G06F 16/26 |
| 2019/0222597 A1 * | 7/2019 | Crabtree | H04L 63/1425 |
| 2021/0133331 A1 | 5/2021 | Lipkis et al. | |

(Continued)

FOREIGN PATENT DOCUMENTS

| | | | | |
|---|---|---|---|---|
| RU | 2710985 C1 * | 1/2020 | | G06F 21/552 |
| WO | WO-2020183012 A1 * | 9/2020 | | H04L 63/0245 |
| WO | WO-2020189668 A1 * | 9/2020 | | G06F 21/552 |

OTHER PUBLICATIONS

P. Mell, K. Scarfone, and S. Romanosky, "A Complete Guide to the Common Vulnerability Scoring System Version 2.0," Jun. 2007; available at www.first.org/cvss/v2/guide.

(Continued)

*Primary Examiner* — Sarah Su
(74) *Attorney, Agent, or Firm* — Naval Surface Warfare Center, Philadelphia Division; Mark J. Rosen (57) ABSTRACT

A Cyber Vulnerability Assessment Tool (CVAST) and CVAST Threat Assessment Heuristic (CVAST THRASH) capable of automated modeling of cyber physical systems, assessment of the nature of cyber risks thereto, and output of such cyber risk assessments are provided.

10 Claims, 5 Drawing Sheets

(56) References Cited

U.S. PATENT DOCUMENTS

2021/0273965 A1\* 9/2021 Pi .......................... H04L 41/145
2021/0288995 A1   9/2021 Attar et al.
2022/0172146 A1\* 6/2022 Zillner .................... G06N 3/08

OTHER PUBLICATIONS

Open Web Application Security Project (OWASP), "OWASP Risk Rating Methodology," OWASP, Sep. 13, 2015; available archived at web.archive.org/web/20160218160854/https://www.owasp.org/index.php/OWASP_Risk_Rating_Methodology.

\* cited by examiner

| Representation (in XML) of a Windows Server 2012 R2 Vulnerability From the National Vulnerability Database: | Ontology Representation of Vulnerability Data for Windows Server 2012 Vulnerability from the National Vulnerability Database: |
|---|---|
| `<entry id="CVE-2015-0001">`<br>`<vuln:cvss>`<br>   `<cvss:base_metrics>`<br>    `<cvss:score>1.9</cvss:score>`<br>`<cvss:integrity-impact>NONE</cvss:integrity-impact>`<br>   `<cvss:availability-impact>NONE</cvss:availability-impact>`<br>`<vuln:product>cpe:/o:microsoft:windows_server_2012:r2::~~~x64~~~</vuln:product>` | `<owl:NamedIndividual rdf:resource="&CPS;Vulnerability"/>`<br>`<CVE_ID rdf:datatype="&xsd;string">CVE-2015-0001</CVE_ID>`<br>`<baseCVSS_Score rdf:datatype="&xsd;string">1.9</baseCVSS_Score>`<br>`<IntegrityImpact rdf:datatype="&xsd;string">NONE</IntegrityImpact>`<br>`<AvailabilityImpact rdf:datatype="&xsd;string">NONE</AvailabilityImpact>`<br>`<Product rdf:product="&_server_2012:r2::~~~x64~~~"/>` |

CYBER VULNERABILITY ASSESSMENT TOOL THREAT ASSESSMENT HEURISTIC

STATEMENT OF GOVERNMENT INTEREST

The invention described herein may be manufactured and used by or for the Government of the United States of America for governmental purposes without payment of any royalties thereon or therefor.

FIELD OF THE INVENTION

The invention is related to the field of cybersecurity, particularly, improved systems and methods for modeling cyber physical systems and conducting cyber risk assessments.

BACKGROUND OF THE INVENTION

Conducting cybersecurity risk assessment for Cyber Physical Systems (CPS) consists of analyzing an abundance of information across multiple knowledge domains, including Engineering, Information Technology, Cybersecurity, and Mission/Business domains. Cyber risk assessment for CPS also consists of determining ways to connect the information, and to prioritize or "weight" the contribution of various information elements or the relationships of information elements to each other. Particularly for CPS networks that are large, complex, or both, this is an insurmountable task for cybersecurity analysts to complete manually.

In order to evaluate the cybersecurity risk posture of a CPS, a cybersecurity analyst must identify technical information sources from across the CPS cyber domains, identify information from the technical information sources that is needed for cyber risk assessment, and store that data for current and future analysis. This data collection is also an extremely time consuming and difficult task for a cybersecurity analyst to complete due to the amount of information that must be consumed and the need to identify which information elements are relevant (or "cyber-critical") and which are irrelevant.

Data collected from various information sources must be distilled into links between concepts and across domains in order to synthesize all information into a meaningful cybersecurity risk assessment. Typically, this process is performed manually, relying on the knowledge, expertise, and past experience of an individual (e.g., in the case of preparing for a penetration test event) or the collective experience of a group (e.g., in the case of a Cyber Table Top-CTT). In either case, reliance on human knowledge, experience, and expertise, as opposed to computational data structures, virtually ensures that the knowledge synthesis cannot be reliably replicated, much less at scale.

When conducting cyber attacks, cyber attackers select specific CPS components (such as a power system) or function (such as providing power) to attack, then proceed to perform a series of adversarial actions and/or access a series of network hosts and endpoints to impact the target. These actions and the network components involved can be collectively modeled as "attack chains." Due to combining information from different CPS domains (cybersecurity, information technology, and engineering domains, for example), it is quite difficult for a cybersecurity analyst to determine all possible attack paths, and when many paths are present, it is difficult to perform a large-scale decision analysis prioritizing the addition of security controls or mitigations along specific paths. Additionally, a manual analysis of the chain of impacts produced by the cascading kinetic effects of a compromise on any particular CPS component significantly relies on subjectivity.

An analysis of kinetic effects necessarily requires identifying which CPS assets are the most critical, synthesizing information from all four CPS domains and prioritizing/weighting the relevancy of specific information elements. This is typically a manual process that would not scale to allow for analyzing large or complex networks, and the same inherent subjectivity described above applies.

Finally, automated methods do not currently exist for performing all of the above processes in an automated manner, and particularly an automated manner that scales to evaluation of large, complex CPS networks. Existing assessment methods rely on a patchwork combination of manual assessment methods (e.g., CTTs) and smaller-scale assessments that may themselves include some limited automated methods (e.g., penetration tests). Identifying holistic interpretations of the results is again a manual process relying heavily on subject-matter expertise, hence introducing subjectivity and not supporting repeatability or standardization.

The art is in need of improved automated systems and methods to model cyber physical systems and conduct cyber risk assessments.

SUMMARY OF THE INVENTION

The Cyber Vulnerability Assessment Tool (CVAST) and CVAST Threat Assessment Heuristic (THRASH) provide a collection of novel automation tools for assessment of the cybersecurity risk posture of Cyber Physical Systems (CPSs), utilizing ontological models in conjunction with large-scale computational analysis. A CPS can be modeled as a combination of network elements and physical elements. Examples of CPS include, among others, ship engineering systems, smart grids, manufacturing plants, nuclear power plants, water utility companies, and aviation systems. Conducting cyber risk assessment on CPSs requires the analysis of multiple knowledge domains including the engineering, information technology, cybersecurity, and mission (business) domains.

CVAST provides the following novel elements for modeling CPSs and and assessing and analyzing cyber risk:
  CPS Information Extraction System for extracting information from various types of data sources from across knowledge domains, including the engineering, information technology, cybersecurity, and mission (business) domains.
  CPS Semantic Model for modeling concepts within and relationships across the engineering, information technology, cybersecurity, and mission (business) domains.

The information gathered by the CPS Information Extraction System and the modeling of the information by the CPS Semantic Model provide support to the following novel cyber risk assessment methods, and their implementation as part of CVAST:
  Attack Graph Algorithm based on electric circuit theory for evaluating attack paths that traverse a CPS.
  Chain of Impacts Algorithm for evaluating the propagation of kinetic effects and other mission/business impacts when one or more components of a CPS are successfully compromised.
  CPS Criticality Algorithm for evaluating the criticality of a component, subsystem, or system within a CPS with respect to the impacts that may result from a successful compromise.

THRASH Cyber Risk Algorithm for quantifying and evaluating the overall cyber risk posture at the component and system levels in a CPS.

In one aspect, the invention is directed to the CVAST and CVAST THRASH tools, and automated methods of using CVAST and THRASH for conducting a cyber risk assessment of a Cyber Physical System (CPS), having the steps of extracting and encoding information from a plurality of knowledge domains using the CPS Information Extraction System; modeling relationships across the domains using a CPS Semantic Model; storing the information in the Cyber-Risk Information Database in accordance with the ontologies provided by the CPS Semantic Model; plotting an attack graph using the Attack Graph Algorithm using an electrical circuit analogy; evaluating the chain of cyber threat impacts using the Chain of Impacts Algorithm; evaluating the criticality of any of a system, a subsystem, or a component, using the CPS Criticality Algorithm; evaluating the cyber risk at the component and system levels in the CPS using the Threat Assessment Heuristic (THRASH) Cyber Risk Algorithm; and outputting the cyber risk assessment. The relationships modeled by the CPS Semantic Model derive from the engineering, information technology, cybersecurity, and mission domains, and the CPS Semantic Model provides ontologies linking components and systems of the CPS across the domains. The CPS may be one found in power grids, manufacturing plants, nuclear power plants, utility companies, and aviation systems. In another aspect, the CPS is a Naval Control System (NCS). For NCS, the CPS Semantic Model provides ontologies that support automated reasoning and computational analysis in the form of semantic decompositions of CPS elements, including missions of Naval vessel platform vessels; a Universal Naval Task List; NCS systems for submarines, surface ships, and airframes; lower level functioning systems; and physical security systems. In another aspect, additional ontologies in the form of semantic decompositions of types of adversaries which target NCS, and motivations of adversaries who target NCS are provided.

In one aspect, the THRASH Cyber Risk Algorithm produces the risk assessment by analysis of risk scores regarding threat, vulnerability, and impact of a component or a system of the CPS. The risk assessment may be in the form of a heat map.

These and other aspects of the invention will be readily appreciated by those of skill in the art from the description of the invention herein.

DETAILED DESCRIPTION OF THE INVENTION

CVAST provides the following distinct cooperative elements:
CPS Information Extraction System
CPS Semantic Model
Attack Graph Algorithm
Chain of Impacts Algorithm
CPS Criticality Algorithm
THRASH Cyber Risk Algorithm Each of these novel systems and methods are described below.

CPS Information Extraction System

Figure 1:
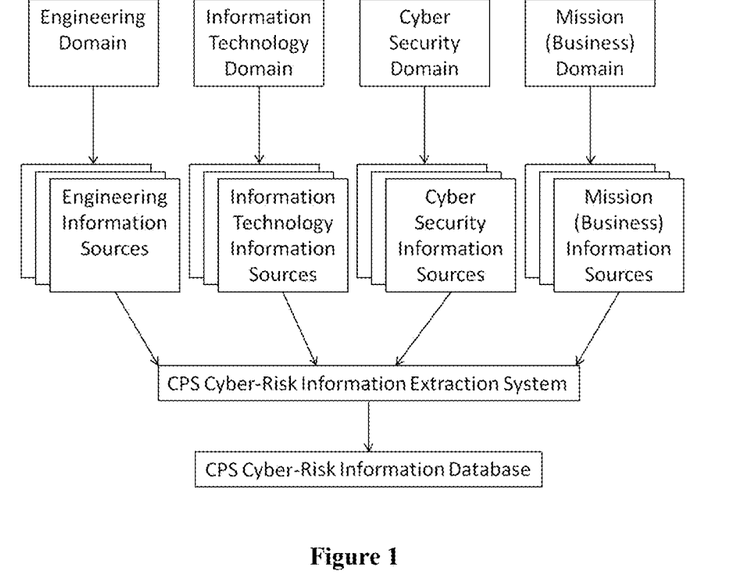
FIG. 1 depicts an embodiment of the CPS Information Extraction System.

The CPS Information Extraction System extracts data from various types of information sources from across knowledge domains relevant to cybersecurity, including the engineering, information technology, cybersecurity, and mission (business) domains, and allows for automatically identifies relationships between cross-domain concepts by utilizing ontological mappings defined in the CPS Semantic Model. Current state-of-the-art information extraction technology does not automatically map concepts across all of the aforementioned domains, which is only possible by utilizing semantic links that define cross-domain relationships. FIG. 1 shows a representation of the CPS Information Extraction System. The technical data sources over which the CVAST CPS Information Extraction System operates include Naval shipboard control system technical manuals, repair manuals, network diagrams, and mission (business) description documents. The CPS Information Extraction System also operates over Open-Source Intelligence (OSINT) and non-publicly accessible Department of Defense (DoD) databases describing cyber security vulnerabilities, vulnerability mitigations, security controls, attack patterns, and adversary attributes.

These sources are represented in a variety of formats supported by the CVAST CPS Information Extraction System including, but not limited to: Microsoft Excel, Microsoft Access, Comma-Separated Values (CSV), markup such as Extensible Markup Language (XML) and Java Simple Object Notation (JSON), as well as human-readable Natural Language.

Beyond static documentation and structured databases, the CVAST CPS Information Extraction System can automatically map Digital Engineering artifacts represented using the System Modeling Language (SysML) to the CVAST ontology. An automatic translation of SysML markup into Resource Description Framework (RDF) "triples" (data elements) is performed using pre-defined mappings to CVAST CPS Semantic Model's ontology.

The information extracted from the data sources is stored in a semantic graph database, the CVAST CPS Cyber-Risk Information Database, which is based on the ontology from the CVAST CPS Semantic Model. The novel CVAST CPS Semantic Model provides the underlying schema used for querying cross-domain knowledge stored in the database, after it has been extracted using the CVAST Cyber-Risk Information Extraction System. As an example of a typical cross-domain query: A cybersecurity analyst who focuses on ship engineering systems is made aware that a specific vulnerability impacts a specific version of firmware found on a programmable logic controller (PLC). The cybersecurity analyst will query the CPS Cyber-Risk Information Database to search across types of ships to see which ships contain that specific version of firmware, and whether the security controls those ships implement would prevent an adversary from exploiting the identified vulnerability. While the CVAST Cyber-Risk Information Database is implemented using existing commercial technologies, these cross-domain queries are only possible once two novel components of CVAST, the CPS Cyber-Risk Information Extraction System and the CPS Semantic Model, have interacted to capture and store information in the CVAST Cyber-Risk Information Database.

The CPS Cyber-Risk Information Extraction System uses entity-and-concept analyzer techniques to identify concepts to pull from the data sources. These concepts are predefined in the CPS Cyber-Risk Information Database by an ontology. For example, in the database, the ontology contains fields for software name, software version, vulnerability metrics from the National Vulnerability Database (NVD), component names, mission names, and more.

Figure 2:
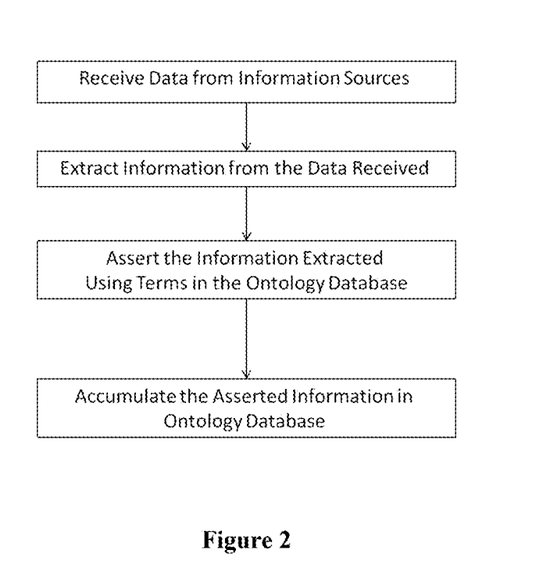
FIG. 2 depicts the flow of information in an embodiment of the CPS Cyber-Risk Information Extraction System.

The information extracted from the data sources is stored in the CPS Cyber-Risk Information Database for querying. The data is stored in the database in Resource Description Framework (RDF) format. The information may be queried using SPARQL (a recursive acronym for SPARQL Protocol and RDF Query Language). FIG. 2 shows the flow for the CPS Cyber-Risk Information Extraction System.

Figure 3:
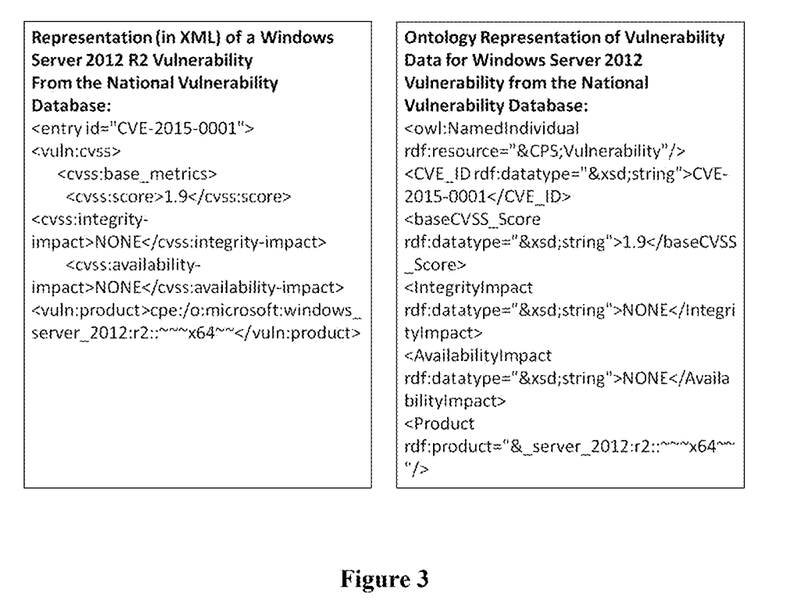
FIG. 3 depicts an embodiment of the CPS Cyber-Risk Information Extraction System and demonstrating how the CPS Semantic Model automatically forms relationships from raw data in the context of example vulnerability information from the National Vulnerability Database (NVD).

Information sources are collected from across the four CPS domains. Information extraction techniques identify information concepts to pull from the information sources. The ontology database contains fields to store the information output by the CPS Cyber-Risk Information Extraction System. FIG. 3 provides an example of the CPS Cyber-Risk Information Extraction System extracting information from one OSINT source, the National Vulnerability Database (NVD), about a specific vulnerability.

CPS Semantic Model

The CPS Semantic Model models relationships within and across the engineering, information technology, cybersecurity, and mission (business) domains as they apply to CPSs generally. In one embodiment, the CPS is Naval Control System (NCS) cybersecurity.

The CVAST CPS Semantic Model is not the first semantic model to address concepts within the cybersecurity domain as they relate to CPS. For example, MITRE Industrial Control System (ICS) ATT&CK and the National Institute of Standards and Technology (NIST) CPS Framework are two such examples. However, large scale CPSs such as NCSs frequently have their own unique concerns outside the general domain of CPS knowledge or concepts, and the CVAST CPS Semantic Model is the first to apply these concepts to such large scale and specifically to NCS. NCS concepts unique to NCS, rather than a subset of overall CPS concerns, include:

1. A semantic decomposition of Naval missions, by type or class of Naval vessel ("platform"), formally expressing Naval instructions and guidance for the assignment of platform-specific Required Operational Capability and Projected Operational Environment (ROC/POE) in the form of an ontology that supports automated reasoning and computational analysis. Prior to development of the CVAST CPS Semantic Model, these concepts were only expressed in the form of paper documents (or digital recreations of paper documents such as in Portal Documents Format-PDF).

2. A semantic decomposition of the Universal Naval Task List (UNTL) in the form of an ontology that supports automated reasoning and computational analysis. Prior to development of the CVAST CPS Semantic Model, these concepts were only expressed in paper documents or digital recreations of paper documents.

3. A semantic decomposition of the classes of NCS that are found across Naval platforms, including but not limited to surface ships, submarines, and airframes. These classes include engineering-domain representations of CPS functionality that are specific to Naval applications, e.g., ballast systems for afloat and undersea platforms, and are in turn linked to mission-domain concepts specific to Naval applications, e.g., the impacts associated with sinking an afloat or undersea asset/platform. No such formally-documented classification exists including an ontological format that supports automated reasoning and computational analysis.

4. A semantic decomposition of the lower-level functional behaviors linking the functionality of NCSs to the missions they are designed to support. These include the ballast example described above, providing chill-water for cooling of radar or weapon systems, executing automatic Command-and-Decision software in response to input from air or ballistic missile tracking and targeting functions, and numerous others. Prior to development of the CVAST CPS Semantic Model, no formal ontology existed to express these concepts in a format that supports automated reasoning and computational analysis.

5. A semantic decomposition of physical security concerns specific to the shipboard deployment of NCSs. While analogous to physical security concepts related to CPS overall, NCS-specific physical security concepts include a representation of shipboard compartments, and classes of shipboard compartments (e.g., berthing, mess, bridge, and others). This allows for automated reasoning of ship-specific physical security concerns, such as the location and orientation of shipboard compartments relative to each other within a ship's hull. These attributes can provide rich input to automated reasoning about a system's cybersecurity risk posture. For example, an adversary who gains access to a specific shipboard compartment may have easier immediate access to the adjacent compartment, compared to a compartment that is two decks above. An adversary with physical access to one specific entry point to an NCS network (i.e., a device such as an operator console) may automatically have access to other entry points located in the same compartment or to targets in the same compartment-possibly rendering a network-based attack irrelevant, depending on the desired target. The CVAST CPS Semantic Model is the only formal ontological representation of the aforementioned shipboard physical security concepts.

6. A semantic decomposition of the specific types of adversaries known to target NCSs, which specifically resulted in a decomposition of Insider Threats based on their operational roles (Officers, Operators, Sailors, In Service Engineering Agents-ISEAs, etc.). The CVAST CPS Semantic Model is the first formal ontological representation of these adversaries.

7. A semantic decomposition of the motivation specific to adversaries targeting NCSs, which is an expanded set of the motivations for targeting CPSs in general. For example, an Insider Threat adversary in the Sailor role may be motivated by a desire to keep a ship in port so that he or she may remain, or an Advanced Nation State adversary may be motivated to disrupt the United States' ability to project force in a specific region of the world. The CVAST CPS Semantic Model is the first formal ontological representation of adversary motivations for targeting NCSs.

The CVAST CPS Semantic Model is well adapted to incorporate these particular NCS concerns related to Naval operations. In other embodiments of the invention, the CVAST CPS Semantic Model may likewise be readily adapted to incorporate the particular specific concerns of other large scale CPSs (e.g., smart grids, manufacturing plants, nuclear power plants, water utility companies, aviation systems, etc.).

With NCS as an example, current state-of-the-art cybersecurity analysis does not include a semantic model or ontology that links all of the aforementioned conceptual domains for the specific NCS subset of CPSs, particularly the semantic links between common cybersecurity vulnerabilities, the NCSs they affect, the threats that can exploit them, the vulnerabilities' impacts on NCSs performance of their respective missions, and finally the security controls or mitigations that can protect NCSs from a successful compromise. The CPS Semantic Model is leveraged by the CPS Information Extraction System to populate a knowledge base linking model NCSs to their vulnerabilities, the missions impacted by those vulnerabilities and potentially degraded by a cybersecurity compromise, and additional security controls that can remove or mitigate the vulnerabilities.

For example, the CPS Semantic Model can model a CPS asset, the hardware and software installed on the asset, the interfaces between the asset and other components of the CPS, and the logical ports, protocols, and services used over those interface. Further, the CPS Semantic Model can characterize physical access attributes such as the asset's location aboard a Naval vessel, whether that physical location is locked or otherwise secured, and whether the asset itself is physically secured (e.g., held within a locked enclosure) or specific physical ports on the asset are physically secured (e.g., an Ethernet port that is blocked using a port blocker). Additionally, the CPS Semantic Model can characterize an adversarial threat in terms of the threat's knowledge, skills, motivation, capabilities, resources, and level of access to the system, as well as attribution of attack patterns linked to the adversary (e.g., by either OSINT or DoD Intelligence Sources).

Figure 4:
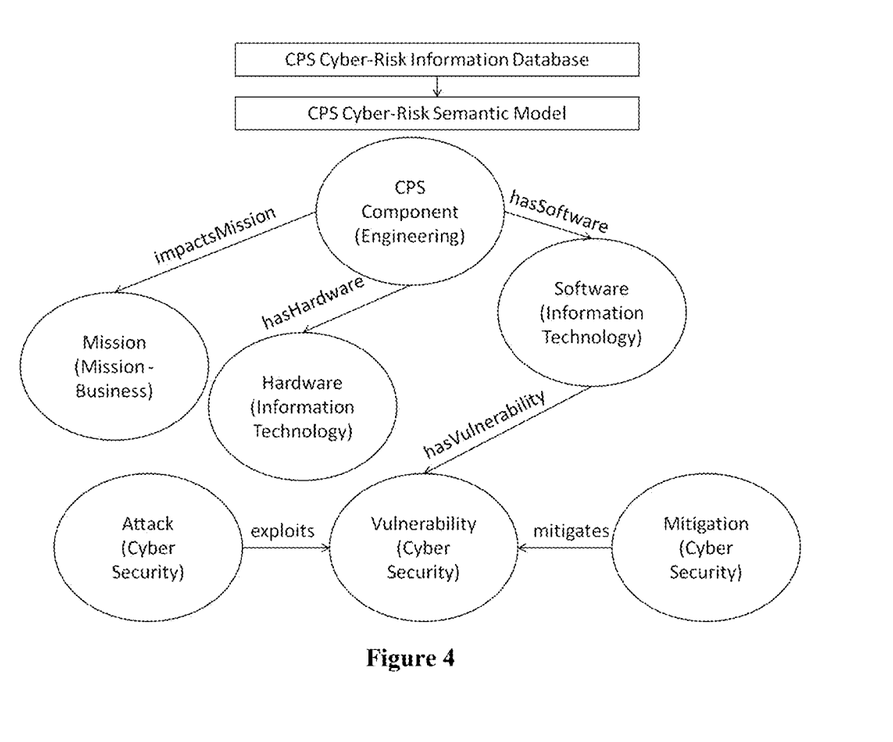
FIG. 4 depicts an embodiment of the CPS Semantic Model with simplified high-level relationships found in the model.

The CVAST CPS Semantic Model links and allows for automated reasoning algorithms to operate over the above CPS model and threat attributes, in order to identify vulnerabilities affecting the CPS asset's specific combination of attributes, the attacks that target these vulnerabilities, the impacts on other components if that selected component is compromised, impacts on functions of components, and the impact on mission areas (or business functions) if that component is compromised. FIG. 4 shows the CPS Semantic Model and the high-level relationships found in the model.

The CPS Semantic Model defines all of the classes and properties ("relationships") to which the specific data elements stored in the CVAST CPS Cyber-Risk Information Database are mapped. These data elements can be thought of as "instances" of the ontological constructs modeled in the CVAST CPS Semantic Model, which provides the semantic links that relate information from all data sources fed into the CVAST CPS Information Extraction System. For example, the NVD listing shown in the left panel of FIG. 3 can be abstracted into a "vulnerability" element linked to the NCSs it affects and ultimately to the missions it impacts, as shown in the right panel of FIG. 3. In this example, the relationship "affects" is defined in the ontology comprising the CVAST CPS Semantic Model, allowing the CPS Information Extraction system to automatically capture a "vulnerability affects device" relationship in the CPS Cyber-Risk Information Database by combining information from two disparate data sources: NVD, and technical documentation characterizing the device configuration.

Figure 5:
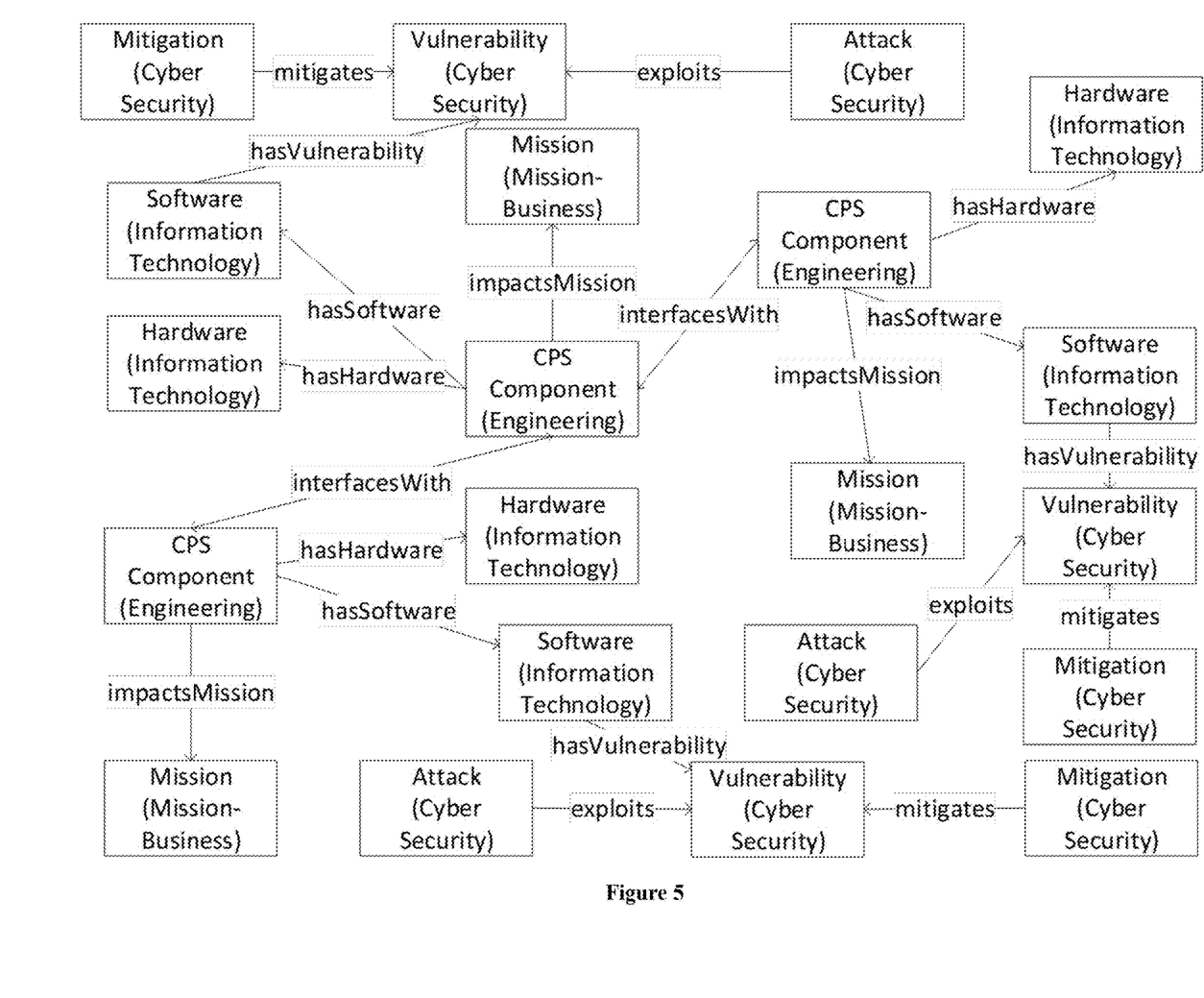
FIG. 5 depicts an embodiment of multiple components and high-level relationships found in the CPS Semantic Model.

FIG. 4 shows the representation of one CPS component and high-level relationships according to the CVAST CPS Semantic Model; however, CPSs are made up of multiple components as illustrated in FIG. 5. FIG. 5 represents a notional CPS system with three components and several high level relationships captured according to the CVAST CPS Semantic Model. It should be noted that the CVAST CPS Semantic Model provides many more possibile relationships than what is shown in FIG. 5. For example, a cyber attack can exploit more than one vulnerability, or a CPS component's software can be linked to multiple vulnerabilities, or multiple CPS components can have the same vulnerability. However, FIG. 5 starts the shows the complexity of CPSs and concepts spanning multiple knowledge domains, the fusion of which is only possible after developing a semantic map that spans domains.

The CVAST CPS Semantic Model links cross-domain concepts together and allows for querying across domains. Additionally, each entity and relationship among entities in the CPS Semantic Model can be assigned metrics, or linked to known metrics from data sources covered by the CVAST CPS Information Extraction System. These metrics can be leveraged for computational analysis, such as the evaluations performed by other components of the CVAST system.

Thus, the CPS Semantic Model provides a mapping over which to perform automated reasoning about the connections across multiple knowledge domains relevant to CPS Cybersecurity Risk Posture in general and NCS Cybersecurity Risk Posture specifically (or other complex CPS), as in the case of a vulnerability (cybersecurity domain) linked to a specific device configuration (information technology domain) that characterizes a CPS asset (engineering domain) that provides a function (engineering domain) that supports a specific mission or business area (mission domain).

Numerous existing methods and tools for performing automated reasoning can be used to infer connections, as will be appreciated by those of skill in the art, using the novel contribution of semantic relationships defined in the CVAST CPS Semantic Model. For example, if Component X is compromised and impacted by a cyber attack and if Component X controls Component Y, then Component Y is impacted too. This helps determine the propagation of threats. A method for assigning weights or properties to entities found in the CPS domains as well as to the relationships between CPS domains can then be used for qualitative and quantitative cyber risk assessment.

Attack Graph Algorithm

Information gathered by the CVAST Information Extraction System and the modeling of this information by the CVAST CPS Semantic Model provide input to the novel Attack Graph Algorithm for evaluating attack paths in a CPS. There is no pre-existing algorithm that models cyber-attacks using the novel methodology employed in CVAST. The CVAST Attack Graph Algorithm employs a metaphorical electrical circuit, analogizing the "ease of exploit" at each point in an attacker's traversal of a network to the electrical circuit concepts of "resistance" and "potential energy."

Cyber attackers seeking to compromise a CPS may intend to impact specific components, such as a power system, or function provided by a CPS, such as providing power. The target system or device is often not directly accessible to the attacker, and thus an attack requires that the attacker traverse several "obstacles" in order to gain access to the target from his or her entry point to the CPS network. In these cases, the "entry point" is a different device from the target, and specifically one to which the attacker can or has gained direct access. If the target is not directly accessible from the entry point itself, the attacker may then pivot to other CPS devices that interface with the target, creating an "attack path" along the physical or logical network interfaces of the CPS.

In order to recommend protection mechanisms for a CPS, Cyber Analysts often "think like an attacker," manually enumerating possible attack paths that an adversary might use to compromise high-value targets. The CVAST Attack Graph algorithm automates this process, using data and metrics gathered from the CVAST Information Extraction System and mapped to the CVAST CPS Semantic Model in order to represent specific CPSs.

CVAST defines an attack path as the series of CPS network devices that an attacker must interface with in order to gain access to a target (i.e., a CPS device that must be compromised to achieve the attacker's desired impacts), from his or her entry point (i.e., the CPS device that the attacker can initially access, whether physically or from a remote location which has a network connection into the CPS at the entry point). The attacker may or may not have to complete additional compromises, pivoting to other devices or systems in order to ultimately gain access to the target. The CVAST Attack Graph Algorithm provides a novel method to automatically:

- Model the overall capability of a cyber attacker as analogous to an electric potential
- Model the "resistance" of CPS devices to cyber attacks by the attacker as analogous to electrical resistance, i.e. the inverse of "ease of exploit"
- Compute the resistance of a CPS device to cyber attacks using metrics extracted by the CVAST CPS Information Extraction System and mapped to the CVAST CPS Semantic Model, including but not limited to Common Vulnerability Scoring System (CVSS) metrics and the known mitigating or reparative effects of the security controls implemented on each CPS device
- Utilize graph theoretic approaches to identify all possible logical/physical paths through a CPS network (i.e., all possible attack paths)
- Compute the overall "resistance" of each path as a combination of each entry or pivot point's resistance, by utilizing techniques from electrical circuit theory
- Compute "potential energy" of a given attacker at a target CPS device, for each possible attack path For further details of CVSS, see P. Mell, K. Scarfone, and S. Romanosky, "A Complete Guide to the Common Vulnerability Scoring System Version 2.0," June 2007.

The parameters used to model an attacker's initial potential energy, analogous to a Direct Current (DC) "source voltage" in an electrical circuit, can be modeled in CVAST using one of multiple user-selected methods:

1) Selecting a known threat from a variety of OSINT and DoD Intelligence sources from which the CVAST CPS Information Extraction System pulls data, with OSINT sources including MITRE ICS ATT&CK. To "translate" threat data from the various sources into a common model, information extracted by the CVAST CPS Information Extraction System is mapped to the CVAST CPS Semantic Model's classes and properties that define adversarial threats (as described above). This mapping is performed by the CVAST CPS Information Extraction System, in a manner similar to data elements extracted from other sources and mapped to other CVAST Semantic Model classes and properties.

2) Defining a "custom" threat through the CVAST User Interface, manually selecting a series of parameters with values ranging from "Critical" to "Very Low." Values include Threat Matrix parameters identified in whitepapers released by the U.S. Department of Energy's Sandia National Laboratories, as well as parameters specific to modeling an insider threat targeting NCSs: the attacker's authorized role, familiarity with the NCS itself, and account privileges possessed by the attacker.

Additionally, users may provide input describing the desired impacts of the attacker in terms of the CVAST CPS Semantic Model. When user input describing the desired impacts is not provided, users can allow CVAST to select default values based on output of the CVAST Chain of Impacts Algorithm (discussed below), which automatically identifies high-value targets based on the modeled mission impacts for a given CPS such as an NCS.

The CVAST Attack Graph Algorithm performs novel computations to translate the input parameters into an electric potential representing the metrics that characterize the attacker (including but not limited to skills, knowledge, motivation, and resources), as well as to characterize the "resistance" at the entry point, pivot point, and targets that the attacker would aim to compromise to achieve his or her desired impacts.

The Attack Graph Algorithm uses graph theoretic approaches to identify all possible permutations of entry points, pivot points, and targets between all possible entry points and targets for a specific CPS. Through novel computation methods, the set of identified attack paths is modeled as an electrical circuit. Devices along each path are modeled as analogous to resistors. The "resistance" value assigned to each individual device is computed through novel methods, incorporating various metrics characterizing "ease of exploit" that are extracted from data sources input to the CVAST CPS Information Extraction System. These include but are not limited to: CVSS metrics associated to NVD listings, the model device's physical and logical network interfaces, vulnerability mitigations and their known effectiveness at reducing the impacts of the associated vulnerabilities, and security controls that are implemented on the device, all of which are characterized in the CPS Semantic Model representation of the target CPS. Applicable vulnerabilities and security controls are identified based on the goals of the attacker and linkages between vulnerabilities and attack objectives according to the CPS Semantic Model. The modeled electric potential of the attacker is applied to the circuit model to determine the susceptibility of each path and individual device to compromises by the attacker. This analysis is performed using Electric Circuit Theory, with susceptibility being analogous to the inverse of resistance and the progression of a cybersecurity attack from entry point to target being analogous to electrical current moving through the circuit.

When identifying all possible attack paths between the selected entry and goal components, the Attack Graph Algorithm evaluates:

- Each path's exploitability, a heuristic computing the cumulative exploitability contributed by each component's known vulnerabilities (i.e., vulnerability metrics associated with vulnerabilities linked to each component).

The "energy," or resource use, required for the threat to successfully exploit all components along each path.

Each exploit completed along an attack path expends some amount of the attacker's overall potential energy. The combination of multiple paths through which energy can flow is analogous to an electrical circuit:

The attacker's potential energy is represented as a Voltage Source with potential energy V.

Each exploited component is represented as a Resistor with resistance R.

Attack paths between the entry component and the targeted component represent parallel branches of the circuit.

A Current, I, flowing from the voltage source through all "resistors" between the entry component and the targeted component.

Figure 6:
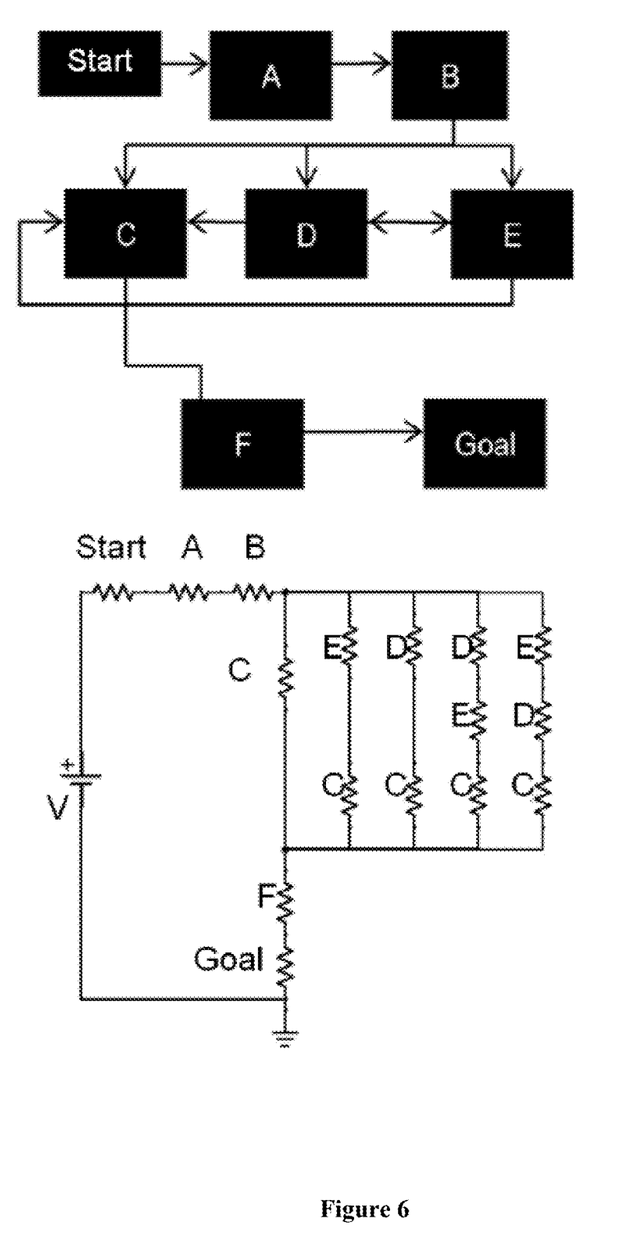
FIG. 6 depicts an embodiment of a generic system graph and its circuit representation.

To model potential energy of the attacker, quantitative representations of user-selected input parameters are summed as follows to determine the overall potential energy of the threat, V:

V=Intensity+Stealth+Time+Personnel+Cyber Knowledge+Kinetic Knowledge+System Familiarity+Access An example graph and its circuit representation are shown FIG. 6. Each branch of the circuit represents a unique attack path through the graph. FIG. 6 depicts an example of a generic system graph (left side) and its circuit representation (right side). Each block in the graph represents a CPS component, represented as an equivalent resistor in the circuit. Branches of the circuit represent unique attack paths. The voltage source in the circuit represents the threat's potential energy.

The Attack Graph Algorithm considers the resistance, R, for each CPS component to be the inverse of its overall exploitability, E:

$$R = \frac{1}{E}$$

Equation 1: resistance of a node

E is computed as the sum of the vulnerabilities' Exploitability metrics, such as CVSS Exploitability Subscores or equivalents available from data sources, for the component's vulnerabilities that meet the following conditions:

Can be exploited based on the attacker's current level of access

Could allow the attacker to work towards gaining access to the target

The latter is determined based on the attacker's desired goals as input by the user, using linkages between vulnerabilities, cyber attack patterns, and CPS impacts that are identified in the CPS Semantic Model. Next, the value of E is adjusted based on security controls that are implemented on the device, as identified by the CPS Semantic Model, in order to produce a "mitigation-adjusted Exploitability Subscore" for the device.

For a CPS Device that has N relevant vulnerabilities, each with mitigation-adjusted Exploitability Subscore $e_{vuln\_i}$:

$$\frac{1}{R_{Node}} = \frac{1}{R_{vuln\_1}} + \frac{1}{R_{vuln\_2}} + \ldots + \frac{1}{R_{vuln_N}} =$$

$$\left(\frac{1}{e_{vuln_1}}\right)^{-1} + \left(\frac{1}{e_{vuln\_2}}\right)^{-1} + \ldots + \left(\frac{1}{e_{vuln\_N}}\right)^{-1}$$

Equation 2: relationship between overall exploitability of a node and the Exploitability Subscores for each of its vulnerabilities In the above equation, the mitigation-adjusted Exploitability Subscore $e_{vuln\_i}$ is a modification of the Vulnerability's Exploitability Metric (e.g., NVD CVSS Exploitability or equivalent) that accounts for the effects of mitigations that have been implemented on the component according to the CPS Semantic Model, or mitigations that have been modeled as implemented to support a "what if?" analysis (e.g., in the case of proposed design changes to the CPS itself). Mitigations modeled according to the CVAST CPS Semantic Model include an effectiveness score, a value from 1.0 to 5.0. If a mitigation associated with some vulnerability is completely effective, the Attack Graph Algorithm considers the vulnerability to no longer be exploitable. If the mitigation is less than completely effective, the exploitability is assigned a reduced weight but not removed.

The effectiveness score of the most effective mitigation is used to adjust the Exploitability metric as follows:

$$e_{vuln\_i} \text{Exploitability} = * \frac{\text{Effective Score of best mitigation}}{\text{Maximum mitigation score}}$$

Equation 3: Calculation of Mitigation-Adjusted Exploitability Subscore

This equation is analogous to linear circuit analysis that sums resistors in parallel.

The Attack Graph Algorithm represents a vulnerability's "resistance to attack" as the inverse of its Exploitability metrics. If any vulnerability has no known Exploitability metrics, it is assumed to be very easily exploitable, and its resistance is set to 0.

For any vulnerability that cannot be exploited from the attacker's entry point, based on the associated access vectors and attacker's ability to utilize the access vectors (both modeled according to the CVAST CPS Semantic Model), the resistance is modeled as "very large" to account for the attacker's inability to perform the exploit. This assumption results in resistance being assigned as follows:

$$R_{vuln} \to \infty$$

Equation 3: resistance for a vulnerability that cannot be exploited from the entry component.

In the circuit representation, that vulnerability's "resistor" effectively becomes an open circuit. Because the attacker cannot complete the exploit, it does not contribute towards the overall exploitability of the component or node.

The exploitability of each branch in the circuit representation is evaluated using a linear circuit analysis technique called nodal analysis. Along any single attack path, the components can be considered as resistors connected in series because the attacker must exploit (or at least access) each node between the entry and target components. The voltage drop across each component or reduction in potential energy to complete the exploit, can be computed using a Voltage Divider equation. For Component n along an attack path with N components total, Vn is computed as follows:

$$V_n = V * \frac{R_n}{R_1 + R_2 + \ldots + R_N}$$

Equation 4: voltage divider equation for analog circuit analysis, used to compute the voltage drop across each resistor connected in series. V represents the threat's total potential energy.

If a component with no exploitable vulnerabilities appears along any series path in the circuit representation, an open circuit is inserted in place of the component. This effectively eliminates the entire attack path, because the attacker does not have the skills, resources, or network access required to compromise one of the components between the entry point and goal. Eliminated attack paths are still displayed as part of the output, but with clear indication that the attacker cannot complete the required exploits.

For each attack path, the Attack Graph Algorithm identifies modeled attack patterns that could plausibly be executed given the attacker's skill level, and overall objectives. These are identified using a variety of data sources, and extracted using the CVAST CPS Information Extraction System. For each attack pattern known to target a component's vulnerabilities and weaknesses, the Attack Graph Algorithm matches the modeled Attack Purposes, Technical Impacts, and Consequence/Motivation Scopes against the goals attempted. Examples that may be captured according to the CVAST CPS Semantic Model include, but are not limited to:

Gain Access: attacker attempts to access the system, if access is not already granted Escalate Privileges: attacker attempts to gain higher privileges than possessed prior to initiating the attack Browse System: attacker explores the component's file system to identify what data is available, determine the capabilities of the component, or identify potential vulnerabilities Impact System: attacker executes the intended impacts, e.g., exfiltrating data or causing the system to crash Maintain Access: attacker attempts to maintain access to the system for future attacks The Attack Graph Algorithm combines "Gain Access" and "Escalate Privileges" into a single goal category. For each component along a given attack path, Attack Graph Algorithm applies the following rules to filter the set of all attacks that could potentially target a component into a set of plausible attacks that the attacker would be likely to execute. These include, but are not limited to, the following scenarios:

Attacks Targeting the Entry Component:
  If the attacker already has elevated privileges according to a threat profile, the attacker will only attempt to Browse System.
  If the attacker does not have elevated privileges, he or she will attempt to Gain Access/Elevate Privileges and Browse System Attacks Targeting the Target Component:
  Attacker will always attempt to Gain Access/Elevate Privileges and Browse System
  Attacker will attempt to Impact System with respect to Confidentiality, Integrity, or Availability, depending on the goals identified in the Threat Profile. Attack patterns with at least one Technical Impact matching the goals are selected.
  Attacker will always attempt to Maintain Access Attacks Targeting any other node along the path:
  Attacker will attempt to Gain Access/Elevate Privileges and Browse System, in order to identify a means of accessing the Goal Node.

The final list of attack patterns is then filtered to remove any attack patterns that are beyond the attacker's skill level, based on the modeled adversary's skills and knowledge.

It is assumed that the attacker can execute attack patterns requiring a skill level equal to or below their own, or attack patterns where the required skill level is not listed. Where multiple skill levels are linked to the attack pattern by source data, the Attack Graph Algorithm assumes the lowest listed skill level and limits the list of possible execution methods accordingly (e.g., if a "Low-skilled" attacker attempts an attack pattern with two possible execution methods, one requiring "Low" skill and the other requiring "Medium" skill, the Attack Graph Algorithm will display the "Low-skill" method).

The outputs of attack path assessment include detailed "steps" for executing each path, as well as exploitability metrics to help users compare paths. The attack path assessment generates attack trees demonstrating the sequences of devices that can be exploited along each possible path, and the relevant vulnerabilities. The output also includes a visualization ranking their exploitability (i.e., total resistance of all components, as described below).

Figure 7:
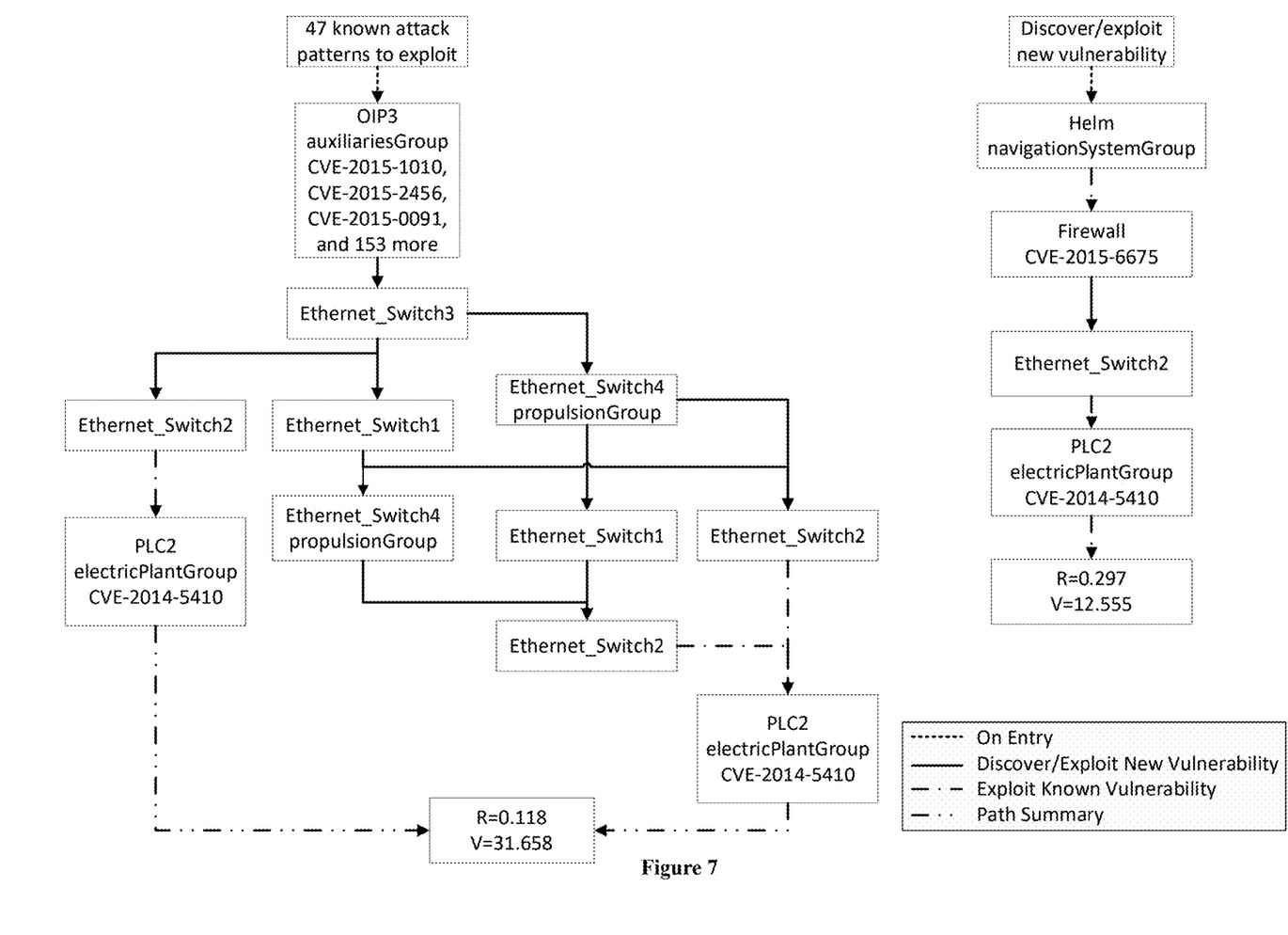
FIG. 7 depicts an embodiment showing sample attack graphs generated by the Attack Graph Algorithm.

An example attack graph generated by the Attack Graph Algorithm is represented in FIG. 7, in which the second-highest blocks in the tree represent the Start Node (entry component), the second-lowest blocks in the tree represent the Goal Node (target component), and blocks in the middle of the tree branches represent other targets accessed or attacked as the attacker attempts to gain access to the target component. The top-most blocks at the beginning of each path indicate exploits targeting the Start Node (to enter the system), and bottom-most blocks summarize each path's resistance to attack (R) and the attacker's energy at the Goal Node (V). Known vulnerabilities of each component are listed within the component's boxes, and known attack patterns are listed in the graph edges.

For each CPS component in the notional system, the vulnerabilities to be exploited are listed in the attack tree. The source data's identifiers of any known attack patterns that could plausibly target each component are also listed, if known; otherwise, the exploitable vulnerabilities are listed. If there is an interface between two components that could serve as an access point for the attacker, but there are no known vulnerabilities or plausible attack patterns, the attack tree lists "Unknown Exploit." This indicates that the interface could expose vulnerabilities not enumerated in the CPS Semantic Model, and should be evaluated manually. In the circuit model, components with no known vulnerabilities are assumed to be "very exploitable," with a Resistance approaching zero. This provides a "worst case" estimate for the Attack Graph Algorithm user.

Exploitability evaluation of possible attack paths produces two quantitative metrics: Total resistance of all components along each path; and, Voltage drop across the goal node for each path. Total resistance can be used to compare possible attack paths. An attacker who planned ahead is often more likely to follow the most easily exploited path to the target, therefore a comparison of paths' resistance to attack can help cybersecurity analysts identify paths with the greatest need for additional security controls. This knowledge can help to prioritize the use of limited resources for the most vulnerable components. The drop in voltage across the targeted component can be compared to the attacker's potential energy to determine how much energy the attacker uses to reach the target. By introducing security measures to increase the energy required to complete an attack, it is possible to reduce the risk of an attack by threats that do not possess the required resources and capabilities.

The CVAST Attack Graph Algorithm provides a method to identity and secure non-essential entry points to high-value CPS assets. The algorithm computes the exploitability of each attack path, provides baseline metrics for hardening efforts, and helps identify CPS assets with the greatest need for additional security measures. Identifying all of the possible paths can help users identify points of entry and paths to an attacker's target, helping to focus security hardening efforts.

Chain of Impacts Algorithm

Information gathered by the CVAST Information Extraction System and the modeling of this information according to the CVAST CPS Semantic Model provide support to the novel Chain of Impacts Algorithm for evaluating the effects of cybersecurity compromises on physical functions, Required Operational Capabilities (ROCs), Mission Operations, and Mission Areas supported by the CPS. Current state-of-the-art within the domain of cybersecurity analysis does not include a propagation of impacts through devices and systems to concepts specific to the missions of shipboard CPSs: ROCs, Mission Operations, and Mission Areas- rather, existing systems focus on direct impacts.

Conducting cyber risk assessment for CPS requires evaluating the possible impacts of a successful compromise. This analysis is complicated by cyber-physical dependencies between CPS components and sub-systems, which are often not applicable in the assessment of IT/business networks. For example, a cyber attacker may only need to compromise one console to produce devastating effects on a CPS, because the console allows for control of inputs to systems that control physical processes. One-example scenario is where the console sends a "heartbeat" message to a critical controller for a power system, allowing an attacker who can stop these messages to cause a "chain of impacts" that could include failure of the power system and subsequently all of the systems it powers, if there are insufficient redundancy or resiliency measures in place to prevent such effects. Particularly for larger CPSs, manually identifying all of the possible chains of impact can be an insurmountable task.

The CVAST Chain of Impacts Algorithm automatically identifies chains of impacts for CPSs. Using information from the CVAST CPS Semantic Model of a given CPS, the Chain of Impacts algorithm identifies the various ways in which even a seemingly minor cybersecurity incident can result in severe functional, operational, and mission impacts. The CVAST Chains of Impacts Algorithm analyzes the impacts of a successful compromise on a CPS component and determines its effects on other CPS components and sub-systems, functionality, required operational capabilities, mission operations, and mission areas.

The algorithm relies primarily on the transitive CPS Semantic Model "impacts" property, a relationship that is input to automatic reasoning modules that perform inference over CPS models. The CPS Semantic Model for a specific system defines direct impact relationships between CPS devices. For example, a console may impact a critical controller, and the critical controller may impact a power system; therefore, the console impacts the power system. While intuitive for a human with intimate knowledge of a specific CPS, the automatic determination of a Chain of Impacts for CPSs that links these chains of cyber and kinetic effects at multiple levels of abstraction, up to the mission (business) concepts they impact, is a novel contribution of the instant invention. The CVAST Chain of Impacts Algorithm implements this functionality using:

- Definition of a novel, transitive "impacts" property in the CVAST CPS Semantic Model
- Definition of direct "impacts" relationships between CPS components
- A novel combination of hybrid SPARQL and Prolog queries to automatically infer the Chain of Impacts according to relationships defined in the CVAST CPS Semantic Model
- Use of automatic reasoning software to execute the queries The transitive nature of the "impacts" property can be exploited by automatic reasoning software to enumerate a full chain of impacts, either with a transitive association (e.g., "the console impacts the power system") or preserving the sequence of the chain impacts (e.g., "the console impacts the controller, the controller impacts the power system")

The CVAST Chain of Impacts Algorithm provides a method for automatically inferring how the effects of a cybersecurity compromise can propagate through other CPS devices and sub-systems, ultimately affecting the functions and missions supported by the CPS. This helps cybersecurity analysts and system designers prioritize the protection of CPS components and sub-systems, and facilitates assessment of "impact" when evaluating the cyber risk posture of CPSs.

CPS Criticality Algorithm

The information gathered by the CVAST CPS Information Extraction System and the modeling of this information by the CVAST CPS Semantic Model provide support to the CVAST CPS Criticality Algorithm. The CPS Criticality Algorithm evaluates a "criticality score" at multiple levels, including for CPS components (e.g., devices considered Lowest Replaceable Units-LRUs), and for complete systems. Criticality is a metric that quantifies the relative importance of a CPS or component to maintaining operation of a system function or mission that is supported by a CPS.

While some existing cyber-security analysis tools assign a score that is analogous to the CVAST Criticality Score, no existing criticality algorithm incorporates a chain of impacts or uses a recursive computation to prioritize specific data fields. The latter is enabled by relationships defined within the CVAST CPS Semantic Model.

An assessment of impacts requires identifying critical components and sub-systems. The CPS Criticality Algorithm supports this goal by assigning a "criticality score" to devices, sub-systems, and entire CPSs. The criticality score can then be used as a factor in cybersecurity risk assessments, e.g. by identifying high-value devices that will likely become targets for an attacker and therefore may require the strongest protection mechanisms.

The CPS Criticality Algorithm synthesizes various properties from the engineering, IT, cybersecurity, and mission (business) domains, as modeled according to the CVAST CPS Semantic Model. Weights are assigned to various properties from these domains in order to compute relative importance, i.e. assign a criticality score, to individual CPS devices, CPS sub-systems, and entire CPSs.

The CPS Semantic Model allows for the assignment of "criticality scores" to mission areas and CPS functions, using a scale from 1.0 to 5.0. Missions and functions can be directly impacted by CPS components (e.g. a PLC that controls the ventilation system can impact the cooling of a server room). However, mission and functions can also be indirectly affected by components that do not have direct impacts mappings from the CPS Semantic Model (e.g.

shutting down a power source for the PLC that controls the ventilation system might also affect the cooling of the server room). In order to capture the importance of component impacts on mission areas and functions, the CPS Criticality Algorithm assigns a criticality score to each CPS component.

The criticality score assigned is based on both the direct impacts of the CPS component, as defined by impacts relationships from the CPS Semantic Model, and its system interfaces: components it controls, powers or communicates with according to the model.

Criticality scores are assigned to each CPS component in three passes, initializing all CPS components with the lowest possible value of 1.0. Each pass considers the factors above, ordered according to priority as follows:

Mission area and function impacts (from "impacts" relationships)

High-priority system interfaces (relationships describing what the component controls or powers)

Low-priority system interfaces (all other interfaces, such as those used for monitoring or data logging)

Direct impacts on other CPS components (derived by automated reasoning over "impacts" relationships defined in model systems, according to the CVAST CPS Semantic Model)

During the first pass of the CPS Criticality Algorithm, CPS components with direct impacts are assigned the criticality score of the mission area or function they impact. During the second pass of the CPS Criticality Algorithm, each component's criticality score is replaced with the greater of these two quantities:

80% of the criticality score of any CPS component on the receiving end of a high-priority interface The original criticality score The second pass of the CPS Criticality Algorithm replaces each CPS component's criticality score with the greater of these quantities:

50% of the criticality score of any other CPS component with which a non-high priority interface is shared The criticality score from the second pass The CPS Criticality Algorithm assigns the highest weight to the criticality of direct impacts on mission areas or functions, a slightly lower weight to high-priority interfaces (e.g. control interfaces or power connections), and the lowest weight to communication interfaces that may hinder data logging or communication, but do not prevent any CPS component from performing its intended function.

At this stage, the criticality score of each CPS component accounts for its impacts on mission areas, functions, and interfacing relationships. The final pass accounts for CPS Semantic Model "impacts" relationships between components. If any component that is impacted has a criticality score greater than the component's score from the first and second passes, the score of the impacted component is assigned.

The above represents how the CPS Criticality Algorithm assigns criticality scores to CPS components. This algorithm also assigns criticality scores to sub-systems and systems. The system-level score assigned is the larger of two quantities:

Criticality score of the most critical mission area or function impacted by the system Criticality score of the most critical component in the system, computed according to the CPS Criticality Algorithm at the component level The CVAST CPS Criticality Algorithm is a method for automatically assigning weights or properties to entities found in the CPS domains as well as to the relationships between CPS domain that can be used for qualitative and quantitative cyber risk assessment. Rather than relying on a subjective, manual identification of critical components, the CPS Criticality Algorithm is a repeatable, automated process. Use of a repeatable process to determine criticality results in more consistent risk assessments, removing the inherent subjectivity of a criticality determination by ensuring that the same assessment criteria are applied consistently. This allows Cybersecurity Analysts to safely compare the results of repeated cybersecurity risk assessments (e.g., "before and after" a configuration or design change) without having to account for differences in methodology.

THRASH Cyber Risk Algorithm

The THRASH Cyber Risk Algorithm combines other assessments to compute a Cyber Risk Score for each CPS component. The risk score incorporates metrics related to the known vulnerabilities, number of interfaces, affected functions and mission areas, threat profile parameters, and the average resistance of all attack paths targeting the CPS component from all possible entry points.

The information gathered by the CVAST CPS Information Extraction System and the modeling of this information by the CVAST CPS Semantic Model support a novel Cyber Risk Algorithm for evaluating the cyber risk posture of a CPS and ultimately assigning a quantitative Risk Score at the component and system levels.

While some existing cybersecurity analysis tools assign a risk score that may be analogous to the output of the CVAST THRASH Cyber Risk Algorithm, no existing algorithm incorporates novel elements of CVAST, including the CPS Chain of Impacts algorithm, Attack Graph Algorithm, and additional attributes defined in the CVAST CPS Semantic Model to compute cybersecurity risk.

Conducting quantitative cyber risk assessment for CPS consists of identifying, collecting, and analyzing an abundance of information from disparate sources that span multiple domains (e.g., engineering, information technology, cybersecurity, and mission/business). Metrics must be identified and extracted, then synthesized to determine risk. The availability of disparate information sources reduces the repeatability and consistency of manual cyber risk assessment processes, in addition to the inherent subjectivity introduced by human judgement. These concerns can be addressed through use of quantitative algorithms and automated assessment methods.

However, existing automatic, quantitative cyber risk assessment methods are largely tailored towards traditional IT networks and do not address security concerns specific to CPSs generally, much less Naval vessel CPSs specifically, including physical, functional, and mission impacts of cyber attacks. By incorporating linkages across cybersecurity and CPS domains, including linkages between CPS components and the functions or missions they support, the CVAST THRASH Cyber Risk Assessment algorithm is tailored specifically for automatic, quantitative, and mission-based assessments of CPSs.

The CVAST THRASH Cyber Risk Algorithm produces quantitative cyber risk scores at the component and system levels, a difficult task to complete manually due to the factors described above. The Cyber Risk Algorithm synthesizes data from the CVAST CPS Semantic Model, Attack Graph Algorithm, Chain of Impacts Algorithm, and CPS Criticality Algorithm in order to produce consistent, non-subjective measures of cyber risk. While its overall perspective on risk is influenced by numerous other risk assessment models, including National Institute of Standards and Technology (NIST) Special Publication (SP) 800-30 and Open Web Application Standards Project (OWASP), CVAST THRASH Cyber Risk Algorithm uses CPS-specific metrics, and in some embodiments metrics and considerations of scenarios specific to Naval operations, and automatic computation, to achieve and output superior, rigorous risk assessment results.

The THRASH Cyber Risk Algorithm assigns risk scores at the component and system levels. At a component level, the algorithm incorporates numerous metrics related to the known vulnerabilities, number of interfaces, affected functions and mission areas, threat profile parameters, and the average resistance of all attack paths targeting the CPS component from all possible entry points. At a system level, the risk score is a weighted average of component-level scores, where weights are determined using output from the CVAST CPS Criticality Algorithm. The Cyber Risk Algorithm described in further detail below is a novel example of a CPS-specific (particularly Navy-specific) modification of the "standard" risk model, described in NIST SP 800-30 (G. Stoneburner, A. Goguen, A. Feringa, "Risk Management Guide for Information Technology Systems," NIST Special Publication SP 800-30, National Institute of Standards and Technology (NIST), Gaithersburg MD, 2002) and other sources as a combination of "Likelihood" and "Impact":

$$Risk = Likelihood \times Impact$$

Equation 6: Standard risk model, where Risk is a combination of Likelihood and Impact "Likelihood" is an estimation of how likely a system is to be exposed to risk, and "Impact" estimates the severity of damage if risk exposure were to occur. The CVAST THRASH Cyber Risk Algorithm extends beyond the NIST Risk approach and uses Threat as another contributing factor to risk as found in the OWASP risk model (see Open Web Application Security Project (OWASP), "OWASP Risk Rating Methodology," OWASP, 13 Sep. 2015):

$$Risk = (Threat \times Vulnerability) \times Impact$$

Equation 7: Cyber Risk, where Likelihood is captured as a combination of Threat and Vulnerability and is combined with Impact Details of the novel metrics used to compute the "Threat," "Vulnerability," and "Impact" factors are described below. Modeling Likelihood as a combination of "Threat" and "Vulnerability" is a heuristic designed to capture how likely it is that a threat can successfully create an adverse outcome by exploiting the system's vulnerabilities, regardless of the severity of that adverse outcome. The "Impact" heuristic captures the severity of the worst adverse outcome that could be caused.

Note that all computations described below are with respect to a single CVAST model CPS, and its specific set of attacker parameters ("threat profile"), the definition of which is described above in the context of the CVAST Attack Graph Algorithm.

Device-Level Risk Score: Likelihood Score

The THRASH Cyber Risk Algorithm considers the "Likelihood" portion of the standard risk model as a combination of two composite scores:

Threat Score: quantitative factors capturing the capabilities, resources, and motivation of a threat to attack the system Vulnerability Score: quantitative factures capturing how easily the threat could leverage his or her capabilities and resources to exploit the system The Threat and Vulnerability scores each range from 0.0 to 1.0. The Likelihood Score for a CPS component, which can range between 0.0 and 1.0, captures how likely it is that a threat could cause an adverse impact (i.e., exploit a system vulnerability), regardless of how severely the system might be damaged. The Likelihood Score is computed by combining the Vulnerability and Threat scores according to Table 1 below, a modification of NIST SP 800-30 Table G-5 where quantitative values are assigned instead of qualitative values.

TABLE 1

Likelihood Scores assigned for Threat Score and Vulnerability Score Combinations

| | | Vulnerability (ranges from 0.0 to 1.0) | | | | |
|---|---|---|---|---|---|---|
| | | 0.0 to 0.2 | 0.2 to 0.4 | 0.4 to 0.6 | 0.6 to 0.8 | 0.8 to 1.0 |
| Threat | 0.8 to 1.0 | 0.5 | 0.5 | 0.7 | 0.9 | 1.0 |
| (ranges | 0.6 to 0.8 | 0.3 | 0.5 | 0.5 | 0.7 | 0.9 |
| from 0.0 | 0.4 to 0.6 | 0.3 | 0.3 | 0.5 | 0.5 | 0.7 |
| to 1.0) | 0.2 to 0.4 | 0.1 | 0.3 | 0.3 | 0.5 | 0.5 |
| | 0.0 to 0.2 | 0.1 | 0.1 | 0.3 | 0.3 | 0.3 |

1. Entry Point Index (Part of Vulnerability Score)

The Entry Point Index for a device, a component of the Vulnerability Score, reflects whether the attacker modeled can directly access the device based on output of the CVAST Attack Graph Algorithm. If direct access is possible, the Entry Point Index is assigned a value of 1.0. Else, it is assigned a value of 0.3. The maximum value is 1.0. A device is considered to be directly accessible by the attacker if it has been identified as such by the CVAST Attack Graph Algorithm.

2. Exploitability Index (Part of Vulnerability Score)

The Exploitability Index, a component of the Vulnerability Score, reflects the average Exploitability of all vulnerabilities present on the CPS component as modeled according to the CVAST CPS Semantic Model, adjusted to incorporate the effects of any Security Controls ("Mitigations") that are implemented on the component and then normalized to a value between 0.0 and 1.0:

$$\frac{\sum \text{Mitigation Adjusted Exxploitability Subscores}}{\text{Max\_Exploitability} * \#\text{Vulnerabilities}}$$

Equation 3: Exploitability Index for a component, averaging the Mitigation-Adjusted Exploitability for all vulnerabilities and dividing by the maximum Exploitability, to normalize the value between 0.0 and 1.0. Computation of Exploitability is described in more detail in the context another component of CVAST, the Attack Graph Algorithm, in previous sections of this document.

The Mitigation-Adjusted Exploitability for all vulnerabilities accounts for any implemented mitigation, as well as any available mitigations selected by the user as candidates to be implemented.

Any device with no known vulnerabilities is assigned an Exploitability Index of 0.0

3. Threat Potential Energy (Part of Threat Score)

The Threat Potential Energy Index, a component of the Threat Score, captures the potential energy of the attacker being assessed, as modeled in the CVAST Attack Path Algorithm. The potential energy is normalized to a value between 0.0 and 1.0 by dividing by the maximum possible value:

$$\frac{\text{Potential Energy}}{\text{Maximum Potential Energy}}$$

Equation 8: Threat Potential Energy Index of a CPS component, capturing the potential energy of the threat targeting the component.

Average Resistance to Attack (Part of Threat Score)

The Average Resistance to Attack Index for a given component averages the total resistance to attack of all potential paths from any plausible entry point, to the device, again leveraging output of the CVAST Attack Graph Algorithm. The Average Resistance is computed as follows:

$$1.0 - \frac{\sum \text{Resistance of plausible attack paths}}{\text{\# plausible attack paths}}$$

Equation 9: Average Resistance Index, which captures how easily all plausible attack paths can be exploited to target a CPS component. Only paths that reach the target component are included in the index.

Device-Level Risk Score: Impact Score

Similar to the Likelihood score, the Impact score can range between 0.0 and 1.0, and is the average of several composite factors described below.

1. Impact Index (Part of Impact Score)

The Impact Index reflects the average Impact of all vulnerabilities present on the CPS component, as modeled according to the CVAST CPS Semantic Model and normalized to a value between 0.0 and 1.0:

$$\frac{\sum \text{Impact Subscores}}{\text{Max\_Impact} * \text{\#Vulnerabilites}}$$

Equation 10: Impact Index for a CPS component, averaging the Impact Subscores for all vulnerabilities and dividing by the maximum Impact Subscore, to normalize the value between 0.0 and 1.0.

Any CPS component with no known vulnerabilities is assigned an Impact Index of 0.0.

2. Interfaces Index (Part of Impact Score)

The Interfaces Index of a CPS component captures the impact of external systems on the receiving end of an interface (communications, power, etc.) from this component. Impact on most critical system with which the component interfaces is captured as follows, leveraging output of the CVAST CPS Criticality Algorithm:

$$\frac{\text{Criticality\_Score(receiving external system)}}{5.0}$$

Equation 11: Interfaces Index of a component, capturing the impact of the component on the most critical system with which it interfaces. This value is normalized by the maximum criticality score according to the CPS Semantic Model. The receiving system's criticality score is computed according to the CVAST CPS Criticality Algorithm.

3. Criticality Index (Part of Impact Score)

The Criticality Index of a CPS device captures its normalized criticality score, assigned according to the CPS Criticality Score Algorithm.

$$\frac{\text{Device Criticality Score}}{5.0}$$

Equation 12: Criticality Index for a CPS component, normalizing its criticality score by the maximum value.

Device-Level Risk Score: Overall Risk Score

The "Likelihood" and "Impact" scores for each CPS component, described above, are combined in a similar manner to NIST SP 800-30. However, the Cyber Risk Algorithm assigns quantitative scores between 0.0 and 1.0 instead of assigning qualitative scores as shown in Table 2.

TABLE 2

Risk Scores Assigned for Likelihood and Impact Score Combinations

|  |  | Impact (ranges from 0.0 to 1.0) | | | | |
| --- | --- | --- | --- | --- | --- | --- |
|  |  | 0.0 to 0.2 | 0.2 to 0.4 | 0.4 to 0.6 | 0.6 to 0.8 | 0.8 to 1.0 |
| Likelihood | 0.8 to 1.0 | 0.2 | 0.4 | 0.6 | 0.8 | 1.0 |
| (ranges | 0.6 to 0.8 | 0.2 | 0.3 | 0.6 | 0.7 | 0.9 |
| from 0.0 | 0.4 to 0.6 | 0.1 | 0.3 | 0.5 | 0.6 | 0.8 |
| to 1.0) | 0.2 to 0.4 | 0.1 | 0.2 | 0.4 | 0.2 | 0.6 |
|  | 0.0 to 0.2 | 0.0 | 0.1 | 0.2 | 0.2 | 0.4 |

The numeric scores from Table 2 translate to the qualitative values from NIST SP 800-30 as follows:
Very Low: scores between 0.0 and 0.2
Low: 0.2 to 0.4
Medium: 0.4 to 0.6
High: 0.6 to 0.8
Very High: 0.8 to 1.0
System-Level Risk Score: Overall Risk Score After scoring each device, an overall risk score for each sub-system in the CPS is determined as a weighted sum of the sub-system's components:

$$\text{Risk(subsystem)} = \sum_{i=1}^{N_{devices}} w_i * \text{Risk(device)}_i$$

Equation 13: Risk score for each sub-system is a weighted sum of the overall risk scores for all devices in the sub-system, as determined from Table 2.

The weights for each component are based on a normalization of their criticality scores, determined using the CPS Criticality Algorithm, dividing each component's individual criticality score by the sum of all component criticality scores for the sub-system:

$$w_n = \frac{\text{critically}_n}{\sum_{i=1}^{N_{devices}} \text{critically}_i}$$

Equation 14: computing the risk score weight for component n, normalizing the criticality of component n using the sum of criticality scores for all components in the same sub-system.

The CVAST THRASH Cyber Risk Assessment Algorithm assigns a risk score specific to CPSs at the component and system level, quantifying and synthesizing linkages between information from the cybersecurity and CPS domains using a repeatable, automated quantitative assessment process. It builds upon existing cyber risk assessment models, including those described in NIST SP 800-30 and the OWASP model, to address concerns specific to CPSs in general and Naval CPSs in particular, such as physical access, functional and mission effects, and others, all of which are accounted for in the other components of CVAST whose outputs are leveraged by the CVAST THRASH Cyber Risk Assessment Algorithm.

Advantages of CVAST and CVAST THRASH:

Some advantages and new features of the CVAST THRASH and methods are described below.

The CPS Information Extraction System provides, among other things, a method for encoding and linking relevant information from disparate domains of knowledge regarding CPS and specifically NCS cybersecurity concepts, formalizing multidisciplinary knowledge putting information from all required domains all in one uniform format and storage location to query and analyze.

The CPS Semantic Model provides, among other things, the following:

A method for reasoning about the connections across different domains as in the case of a vulnerability (cybersecurity domain) found on a piece of software (information technology domain) that is on a CPS asset (engineering domain) that provides a function (engineering domain) that supports a specific mission or business area (mission domain).

A method for inferencing (for example if Component X is compromised and impacted by a cyber attack and if Component X controls Component Y, then Component Y is impacted too). This allows for an automated analysis of the propagation of threats.

A method for assigning weights or properties to entities found in the CPS domains as well as to the relationships between CPS domain that can be used for qualitative and quantitative cyber risk assessment.

The CVAST Attack Graph Algorithm provides, among other things, a method to identity and secure non-essential entry points to high-value CPS assets. The algorithm computes the exploitability of each attack path, provides baseline metrics for hardening efforts, and helps identify CPS assets with the greatest need for additional security measures based on the objectives an attacker would be able to achieve at each point in the chain and specific points' "resistance" to attack. Identifying all of the possible paths can help users identify points of direct entry to an attacker's target, helping to focus security hardening efforts.

The CVAST Chain of Impacts Algorithm provides, among other things, the ability to analyze system-wide impacts that might occur when a given CPS component is successfully compromised, particularly in the context of Naval missions with traceability up to higher-level mission concepts such as Required Operational Capabilities, Mission Operations, and Mission Areas. This level of analysis is crucial for enumerating the propagation of minor compromises to major mission impacts, potentially revealing major impacts related to the compromise of seemingly-minor components.

The CVAST CPS Criticality Algorithm provides, among other things, an automatic method for assigning value to a CPS component and systems based on its relative importance to the operation of the system, other components, and performance of the associated Naval missions.

The CVAST Cyber Risk Algorithm provides, among other things, a method to summarize findings from all of the above assessments metrics related to the known vulnerabilities, number of interfaces, affected functions and mission areas, threat profile parameters, and the average resistance of all attack paths targeting the node from all possible entry points.

A comprehensive cyber vulnerability assessment may be performed using CVAST with each of its cooperative elements: CPS Information Extraction System; CPS Semantic Model; Attack Graph Algorithm; Chain of Impacts Algorithm; CPS Criticality Algorithm; and THRASH Cyber Risk Algorithm. The resulting assessment may be output in a variety of forms accessible to the user, including visibly on a display and/or saved as a document. Such output may include a "heat map" identifying multiple cyber vulnerability risks in a system.

The present invention is not to be limited in scope by the specific embodiments described above, which are intended as illustrations of aspects of the invention. While many embodiments have been exemplified in the context of a CPS which is a Naval NCS, a wide variety of CPSs are amenable to risk assessment using the invention. Functionally equivalent methods and components are within the scope of the invention. Various modifications of the invention, in addition to those shown and described herein, will be readily apparent to those skilled in the art from the foregoing description. Such modifications are intended to fall within the scope of the appended claims. All cited documents are incorporated herein by reference.

What is claimed is:

1. A computer system capable of implementing a Cyber Vulnerability Assessment Tool (CVAST) for conducting and outputting a cyber risk assessment of a Cyber Physical System (CPS), comprising:
- a CPS Information Extraction System for extracting information from a data source;
- a CPS Semantic Model for modeling relationships across a plurality of domains;
- an Attack Graph Algorithm for analyzing a path from an entry point to a target using an electrical circuit analogy;
- a Chain of Impacts Algorithm for evaluating a chain of cyber threat impacts;
- a CPS Criticality Algorithm for evaluating a criticality of a system, a subsystem, or a component;
- a THRASH Cyber Risk Algorithm for evaluating the cyber risk at component and system levels of the CPS.

2. The CVAST of claim 1, further comprising a Cyber-Risk Information Database for storing the information extracted by the CPS Information Extraction System in accordance with a plurality of ontologies provided by the CPS Semantic Model.

3. The CVAST of claim 1 wherein the relationships modeled by the CPS Semantic Model derive from the domains comprising the engineering, information technology, cybersecurity, and mission domains.

4. The CVAST of claim 3, wherein the CPS Semantic Model provides a plurality of ontologies linking components and systems of a CPS across the domains.

5. The CVAST of claim 1, wherein the CPS is one operating in the group consisting of power grids, manufacturing plants, nuclear power plants, utility companies, and aviation systems.

6. The CVAST of claim 1, wherein the CPS is Naval Control System (NCS).

7. The CVAST of claim 6, wherein the CPS Semantic Model provides ontologies that support automated reasoning and computational analysis, in the form of semantic decompositions of CPS elements, the CPS elements comprising at least one of:
- missions of Naval vessel platform vessels;
- a Universal Naval Task List;
- NCS systems for submarines, surface ships, and airframes;
- lower level functioning systems; and
- physical security systems.

8. The CVAST of claim 7, wherein the CPS Semantic Model further comprises ontologies that support automated reasoning and computational analysis, in the form of semantic decompositions of types of adversaries which target NCS, and motivations of adversaries who target NCS.

9. The CVAST of claim 1, wherein the risk assessment is a heat map.

10. A risk assessment produced by the CVAST of claim 1.

* * * * *